C. W. STEEN.
SHAFT BEARING.
APPLICATION FILED AUG. 29, 1914.
1,182,596.
Patented May 9, 1916.
2 SHEETS—SHEET 1.
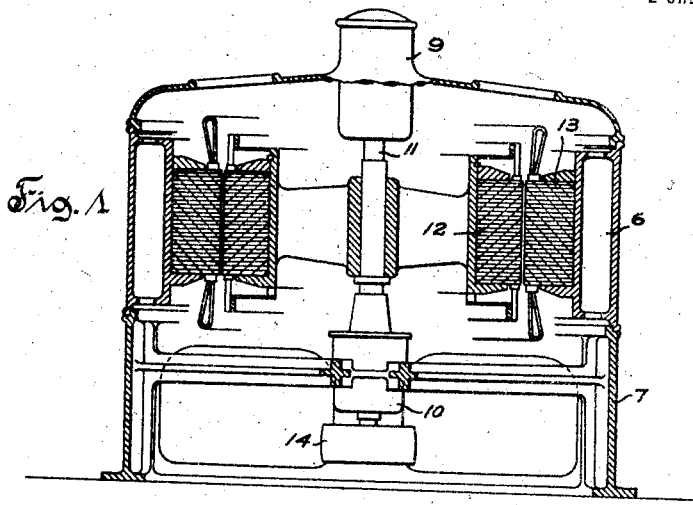
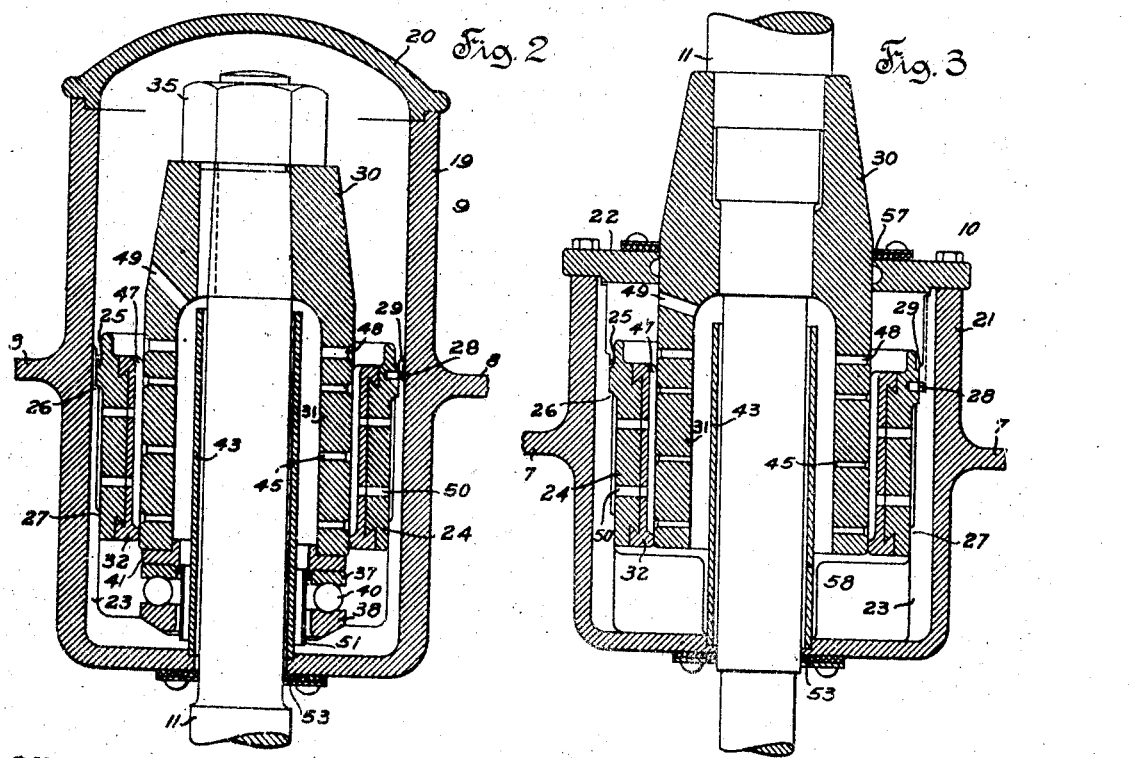
Witnesses
Rob. E. Stoll
J. W. Kane
Inventor
C. W. Steen
By G. F. Oelwein
Attorney

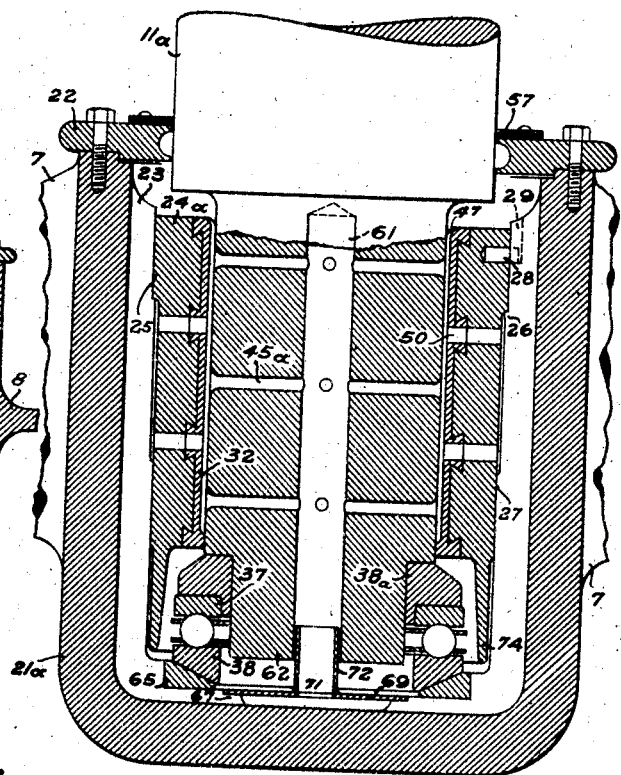

UNITED STATES PATENT OFFICE.

CHARLES W. STEEN, OF NORWOOD, OHIO, ASSIGNOR TO ALLIS-CHALMERS MANUFACTURING COMPANY, OF MILWAUKEE, WISCONSIN, A CORPORATION OF DELAWARE.

SHAFT-BEARING.

1,182,596. Specification of Letters Patent. Patented May 9, 1916.

Application filed August 29, 1914. Serial No. 859,267.

*To all whom it may concern:*

Be it known that I, CHARLES W. STEEN, a subject of the King of Norway, residing at Norwood, in the county of Hamilton and State of Ohio, have invented a certain new and useful Improvement in Shaft-Bearings, of which the following is a specification.

This invention relates in general to bearings for shafts, and has particular relation to bearings for shafts of machines of the vertical type.

It is an object of this invention to provide an improved shaft bearing construction, which is comparatively simple in design and efficient in operation.

It is a further object of this invention to provide an improved construction of shaft and bearing for vertically disposed shafts, having provision for the efficient lubrication of the bearing and shaft.

These and other objects are attained by this invention, the various novel features of which will appear from the description and drawings, disclosing one embodiment of this invention, and will be particularly pointed out in the claims.

In the accompanying drawings: Figure 1 is a partial vertical section of a dynamo electric machine of the vertical type, embodying this invention. Fig. 2 is an enlarged vertical section of the upper bearing of the machine shown in Fig. 1. Fig. 3 is an enlarged vertical section of the lower bearing of the machine shown in Fig. 1. Fig. 4 is an enlarged vertical section of a modification of the lower bearing construction of Fig. 3. Fig. 5 is a vertical section of a modification of the upper bearing construction of Fig. 2. Fig. 6 is a vertical section of a further modification of upper bearing construction.

In accordance with the disclosure in the drawings, wherein the invention is shown as being applied to a dynamo-electric machine of the vertical type, the yoke or frame 6 of a dynamo-electric machine is supported on a frame 7. An upper end casing 8 incloses the upper side of the machine and is provided with a bearing housing 9, which may be integral therewith, as shown. A bearing housing 10 is supported in place by the frame 7, shown as being integral therewith; and a shaft 11 operates in the bearings 9 and 10. The rotor 12 of the dynamo-electric machine, here shown as a squirrel-cage rotor of an induction motor, is supported on the shaft 11 in position to coöperate with the stator 13. A driving pulley 14 may be mounted on the shaft 11 below the bearing housing 10.

As shown in Fig. 2, the bearing housing 9 comprises a casing portion 19 and a removable cover therefor 20, the casing portion being integral with the end casing 8. On the inner side of the casing, at the lower portion thereof, spaced, integral flanges 23 are formed. A bearing bushing 24, having an external projection 25 at its upper end, is placed inside the flanged portion of the casing 9 and is held in place therein by engagement of the portion 25 with shoulders 26 on the flanges 23. The bearing bushing 24 may bear on the flanges 23 only at the upper portion 25 and a lower portion 27, as shown, intermediate portions being spaced from the flanges. The bearing bushing 24 may be held against angular movement by the engagement of a pin 28, secured thereto, in a slot 29 of the flanged portion of the housing.

Keyed or otherwise secured to the shaft 11, near the upper portion thereof, is a sleeve 30, the lower portion 31 of which is spaced from the shaft 11. The spaced portion 31 is of such outer diameter as to bear on a bearing portion 32 of the bushing 24, which bearing portion may be of babbitt, bronze, etc. If the sleeve 30 is keyed to the shaft, a slight taper at the portion of the shaft with which the sleeve engages will serve to limit the downward movement of the sleeve, and the same may be held at its lower limit of movement by a nut 35 threaded on the end of the shaft and bearing on the upper end of the sleeve. As shown, this bearing is of the thrust type, the thrust portion of the bearing, of the ball type, being interposed between the lower end of the sleeve portion 31 and the lower end of the casing. This bearing comprises an upper bearing plate 37 and a lower bearing plate 38 which form a race-way for bearing balls 40. The upper bearing plate 37 is held in position and the weight of the machine is transmitted from the sleeve 30 to the bearing balls through an alining washer 41; and the lower bearing plate 38 is held in position through the engagement between a beveled surface on its lower side and beveled surfaces on portions of the flanges 23 extending along the bottom of the housing. In order to confine oil within the bearing housing and to prevent the passage thereof downward along the shaft, a tube or collar 43 is secured in position, as to the bottom of the housing, and slightly spaced from the shaft. This tube 43 extends to the upper portion of the space between the sleeve portion 31 and the shaft 11. Radially disposed and spaced ports 45 through the sleeve portion 31 convey oil from the inner space to the bearing surface of the part 32, the latter being provided with a plurality of spaced longitudinal grooves 47, closed at their lower ends and open at their upper ends, with which the radial ports 45 communicate during the operation of the shaft. Near the upper end of the spaced sleeve portion 31, radial ports 48 are provided which act as overflow means for the space between the sleeve portion 31 and the tube 43, the port 49 through the sleeve 30 serving to equalize the pressure on the two bodies of oil. The bushing 24 and the bearing portion 32 may be provided with ports 50 which are axially staggered with relation to the ports 45 and serve as a means of communication between the grooves 47 and the space between the flanges 23. A collar or tube 51 is secured in place at the lower end of the casing and acts as a baffle to insure that the oil will pass along the bottom of the casing before passing into the space between the tube 43 and the sleeve portion 31. A dust guard 53 may be secured to the bottom of the casing to prevent the entrance of dust or dirt about the shaft.

In the ordinary operation of the machine, the bearing housing 19 is filled with oil to a point slightly above the lower edge of the overflow ports 48, the level on the inner side of the sleeve portion 31 being maintained the same as that on the outer side thereof through the overflow ports 48. As the machine operates, oil is fed to the bearing surfaces of the sleeve portion 31 and the part 32 through the radial ports 45, the oil being forced from these ports 45 by the action of centrifugal force. The longitudinal grooves 47, which communicate with the ports 45 during the rotation of the sleeve portion 31, are thus supplied with oil. A portion of the oil may be taken up between the bearing surfaces of the sleeve portion 31 and the part 32, and the remainder passes along the grooves 47 to the upper end thereof, in case the bearing bushing 24 and the bearing portion 32 are not provided with ports 50, and into the body portion of the casing. When ports 50 are provided, as in the construction shown in Fig. 2, a portion of the oil passes out through the upper ends of the grooves 47 and the remainder is forced through the ports 50 by the accumulated pressure in the grooves 47, and into the space between the flanges 23, whence it passes downward about the ball bearing, and through the collar 51 to the bore of the sleeve portion 31, that is, the space between the tube 43 and the sleeve portion 31 to take the place of the oil that has passed therefrom for lubricating purposes. It is to be noted that, as the oil at the bearing surfaces of the sleeve portion 31 and the part 32 becomes heated, the same tends to rise to the upper portion of the bearing bushing and thus creates a natural circulation which assists in efficiently lubricating the bearing. The oil level in the space between the sleeve portion 31 and the tube 43 is limited by the overflow ports 48.

As shown in Fig. 3, the bearing 10, quite similar in construction to that shown in Fig. 2, is of the guide type. The sleeve 30 is preferably shrunk on the shaft 11, shouldered portions on the sleeve engaging with corresponding portions on the shaft. A cover or cap 22 on the housing 21, fitting comparatively closely about the sleeve 30, is preferably provided with a dust guard 57. The flanges 23 on the side wall of the housing may be provided with extensions 58 integral with the bottom of the housing, these flange extensions acting as baffle plates to prevent the oil from being churned by the action of the rotating sleeve. If desired, plates may be disposed on the upper edges of these flange extensions 58 to further prevent such churning action.

The operation of the device shown in Fig. 3 is quite similar to that of the structure shown in Fig. 2, the only difference being the absence of the ball bearing and associated parts and the baffle tube 51; the oil passing directly from the space between the flanges 23 and along the bottom of the housing to the space between the tube 43 and the sleeve portion 31.

In the modified construction shown in Fig. 4, the bearing housing 21ª is of the lower bearing type and receives the lower end of the vertically disposed shaft 11ª. Instead of having a separate, spaced sleeve portion, similar to 31 of the bearing structures shown in Figs. 2 and 3, the shaft 11ª is provided with a central bore 61 at its lower end. The portion of the shaft surrounding this bore may be considered somewhat analogous to the spaced sleeve portion 31 of the structures of Figs. 2 and 3. The end of the shaft is of reduced cross section, as shown at 62. The bore 61 communicates with the bearing surfaces of the shaft 11ª and the part 32, through spaced, radial passageways 45ª, which are disposed out of radial alinement with the ports 50 of the bushing 24ª. The bearing structure disclosed in this figure is of the ball thrust type, the bearing plate 37 being held in operative position by the alining washer 38ª, which is disposed between such plate and a shouldered portion between the body of the shaft 11ª and its reduced end extension 62, this washer serving to transmit the weight of the machine to the thrust bearing. The bearing plate 38, having a beveled lower face, is held in position by the engagement of such beveled face with a beveled face on a washer 65, held in position on shouldered portions of the flanges 23. In shouldered portions 67 of extensions of the flanges 23 along the bottom of the housing 21ª, is held a plate 69 having a central opening 71, a tube or collar 72 being secured to the plate about this opening and extending into the bore 61 of the shaft for an appreciable distance. The bearing bushing 24ª is provided with an integral annular flange 74 which is disposed in the space between the ball thrust bearing and the lower part of the flanges 23 on the side wall of the housing. It is to be noted that the lower end of this flange 74 is preferably below the upper surface of the bearing plate 38, so as to serve as a baffle to prevent the oil in the spaces between the flanges 23 from being subjected to centrifugal force due to the rotation of the reduced portion 62 of the shaft. The upper end of the bore 61 is preferably somewhat above the upper end of the bushing 24ª and bearing surface 32. Radial overflow means may be provided, to serve as a communication between the upper end of the bore and the space about the bushing 24ª. The upper end of the casing may be closed in the same manner as is the casing 21 of the structure shown in Fig. 3.

In the ordinary operation of the bearing shown in Fig. 4, the casing contains oil to a point adjacent the upper end of the bore 61. As the shaft rotates, oil is thrown out radially from the ports 45ª by centrifugal force, to the bearing surfaces of the shaft and part 32, being received in the longitudinal grooves 47 in the bearing surface 32. The oil not taken up from these grooves by the shaft, flows upward or downward to the radial ports 50 in the bushing 24ª and part 32, and through these ports to the spaces between the flanges 23. A portion of the oil passes out through the upper ends of the passages 47. The oil is circulated upward in these passages 47 and also downward therein and outward through the ports 50 by the accumulated pressure therein due to the oil that is forced from the ports 45ª. Natural circulation, caused by the oil that has become heated at the bearing surfaces, is also present to some extent. The oil may pass downward in the spaces between the flanges 23 to the lower portion of the casing, the main body of the oil passing beneath the plate 69 and through the tube 72 into the bore 61 for redistribution to the bearing surfaces. A small portion of the oil passes up between the inner edge of the washer 65 and the outer edge of the plate 69, this body of oil being thrown out approximately radially to lubricate the ball bearings, and then passing into the space between the flanges 23 for further circulation, being forced into this path by the flange 74 which acts as a baffle.

As shown in Fig. 5, a bearing of the general construction shown in Fig. 4, is adapted for use as the upper bearing of a vertical machine, the shaft 11ª passing through the lower end of the bearing housing 19ª and the upper end of the shaft being disposed within such housing. While this bearing is shown as being of the guide type, it will be apparent that it might be modified so as to act also as a thrust bearing. The casing 19ª is provided with an intermediate partition 81, preferably integral with the casing. The bore 61ª opens from the upper end of the shaft and may be closed by a removable screw cap 82. In order to insure that there be no leakage of oil from the casing about the shaft 11ª, a packing strip 83 may be inserted in a recess in the lower end of the casing, and a gland 84 may be used for securing the packing strip therein. Communication is established between the bore 61ª of the shaft and the chamber 85, formed between the partition 81 and the lower end of the casing, through radial ports 86. Since, in the operation of this device, the oil passes into the bore 61ª at the bottom thereof, it will be obvious that some means must be provided for overcoming the action of centrifugal force at this point. Accordingly, a pump or other forcing means, not shown, has its inlet communicating with the lower part of the space between the flanges 23, through a pipe 88, and has its outlet communicating with the chamber 85 through a pipe 89. Sufficient pressure is established on the oil passing from the pump to force the same through the radial ports 86 and into the bore 61ª.

In the operation of the construction shown in Fig. 5, the oil, which has been forced into the bore 61, is thrown out through the radial passages 45ª to the bearing surfaces of the shaft and the part 32, and along the grooves 47 and through the radial ports 50 in the bushing 24ª and part 32 to the space between the flanges 23. If desired, the upper end of the grooves 47 may be closed, as shown at 90, to prevent forcing too great an amount of oil through the upper end thereof, in case the pressure within the bore 61ª is excessive.

In the modification shown in Fig. 6, an upper bearing somewhat similar to that shown in Fig. 5 is disclosed. The present bearing structure, however, differs from that of Fig. 5 in that no pump or other forcing means is used, the required circulation of oil within the bearing housing being secured without any external means. The upper ends of the grooves 47 are preferably closed.

The bearing bushing 24$^b$ is preferably provided with a recessed portion 91 at its upper end adjacent the shaft, the inner edge of this portion being threaded for engagement with a threaded flange 92 on a plate 93, whereby the plate is secured in place. This plate 93 is provided with a central opening 94, about which is formed a flange or collar 95, the lower end of which extends into the bore 61$^a$. Small radial ports 96, may be provided, which afford communication between the lower end of the bore 61$^a$ and the space between the flanges 23$^a$, at a point between the bushing 24$^b$ and the bottom of the casing. These radial openings, when provided, serve to assist in circulating the oil, acting to force oil out into the passages between the flanges 23 and upward therein to the upper side of the plate 92.

In the ordinary operation of the bearing construction, shown in Fig. 6, the housing is filled with oil to a point slightly above the upper set of ports 45$^a$. As the shaft rotates, oil is forced out radially through the ports 45$^a$ to the lubricating grooves 47, whence it passes through the ports 50 to the spaces between the flanges 23. The heated condition of the oil along with whatever pressure may be established therein, on account of accumulated pressure due to centrifugal force, exerted by oil in the ports 45$^a$, is sufficient to cause the passage of the oil to the upper side of the plate 92, whence it passes back through the tube 95 to the bore 61$^a$.

It should be understood that it is not desired to be limited to the exact details of construction shown and described, for obvious modifications will occur to a person skilled in the art.

It is claimed and desired to secure by Letters Patent:

1. In combination, a bearing housing provided with longitudinal grooves on the inner side wall and with substantially radially extending ribs along the inner side of the bottom thereof, the spaces between said ribs constituting passages communicating with said longitudinal grooves, a bearing bushing held in place in said housing, and a shaft having a bearing portion in the form of a hollow cylinder, the bore of said cylinder portion being open to communication with the longitudinal grooves in said housing through the passages formed between the ribs at the bottom of said housing, and said cylindrical portion being provided with openings to afford communication between said bore and the bearing surfaces of said shaft and bushing.

2. In combination, a bearing housing, a bearing bushing mounted in said housing, one of said parts being provided with grooves to afford communication between the ends of said bushing, and a shaft, the bearing portion of said shaft being in the form of a hollow cylinder throughout substantially its entire length, said bearing portion being provided with openings at spaced points throughout its length to afford communication between the bore of said cylindrical portion and the bearing surfaces of said shaft and said bushing, and said bushing being provided with vertically extending grooves on its bearing surface and with radial ports intermediate its ends communicating therewith and with the grooves between said bushing and said housing.

3. In combination, a bearing housing, a bearing bushing within said housing and spaced from the bottom thereof, one of said parts being provided with one or more longitudinal grooves providing communication between portions of said housing at the upper and lower ends of said bearing bushing, and a shaft within said bearing bushing, the bearing portion of said shaft being in the form of a hollow cylinder having its bore communicating freely with said longitudinal grooves adjacent the lower end of said housing and being provided with passages affording communication between the interior recess of said shaft and the bearing surfaces of said shaft and said bushing, and said bearing bushing being provided with passages affording communication between the bearing surface of said bushing and said longitudinal grooves, the passages of said shaft and said bushing being staggered relatively to each other.

4. In combination, a bearing housing, a bearing bushing within said housing and spaced from the bottom thereof, one of said parts being provided with longitudinal passages affording communication between portions of said housing at the upper and lower ends of said bearing bushing, and a shaft within said housing having a bearing portion of hollow cylindrical form, said bearing housing being provided with substantially radially extending ribs or flanges at the lowest point of the inner side of the bottom thereof for preventing churning of oil at the bottom of said housing.

5. In combination, a bearing housing, a bearing bushing within said housing and spaced from the bottom thereof, a shaft within said bearing housing and having its bearing portion of hollow cylindrical form and spaced from the bottom of said housing, ribs formed on the inner side of the bottom of said housing, and a thrust bearing supported in operative position on said ribs and operatively associated with the bearing portion of said shaft.

6. In combination, a bearing housing, a bearing bushing within said housing and having portions thereof spaced from said housing to constitute passages affording communication between the portions of said housing at the upper and lower ends of said bushing, a shaft within said bearing bushing and having its bearing portion of hollow cylindrical form, a thrust bearing supported in operative position at the bottom of said housing and operatively associated with the lower end of the bearing portion of said shaft, passageways being provided beneath said thrust bearing and affording communication between said first mentioned passageways and a point radially within said thrust bearing, and a tubular guide supported at the bottom of said housing and operative to insure the passage of oil axially through said thrust bearing to the bore of the bearing portion of said shaft.

7. In combination, a bearing housing, a bearing bushing mounted in said housing, one of said parts being provided with grooves to afford communication between the ends of said bushing, a shaft, the bearing portion of said shaft being in the form of a hollow cylinder, said bearing portion being provided with openings to afford communication between the bore of said cylindrical portion and the bearing surfaces of said shaft and said bushing, said bearing housing being provided with ribs at the inner side of the bottom forming passageways communicating with said grooves, a part supported by said ribs and provided with a beveled seat, and a thrust bearing provided with a correspondingly beveled seat and associated with the beveled part on said housing and serving to center said thrust bearing, said thrust bearing forming a seat for the cylindrical bearing portion of said housing.

8. In combination, a bearing housing, a bearing bushing mounted in said housing, one of said parts being provided with grooves to afford communication between the portions of said housing at the ends of said bushing, a shaft, the bearing portion of said shaft being in the form of a hollow cylinder, said bearing portion being provided with openings to afford communication between the inner recess of said cylindrical portion and the bearing surfaces of said shaft and said bushing, ribs associated with the bottom of said housing and providing passageways communicating with said grooves, and a plate seated on said ribs and provided with a tubular portion affording communication between the passageways formed by said ribs and the inner recess of the bearing portion of said shaft.

9. In combination, a bearing housing, a bearing bushing mounted in said housing, one of said parts being provided with one or more grooves to afford communication between the portions of said housing at the ends of said bushing, a shaft, the bearing portion of said shaft being in the form of a hollow cylinder, said bearing housing being provided with ribs extending along the inner side of the bottom of said housing, a thrust bearing seated on said ribs and operatively associated with the bearing portion of said shaft, said bearing bushing having a downwardly extending annular projection disposed between and having portions spaced from said thrust bearing and the side wall of said housing.

In testimony whereof, the signature of the inventor is affixed hereto in the presence of two witnesses.

CHARLES W. STEEN.

Witnesses:
 ADAM ITTEL,
 CHAS. F. WARNER.